Dec. 29, 1953  W. F. MARTIN  2,663,964
ARTIFICIAL FISHING BAIT
Filed Oct. 13, 1947
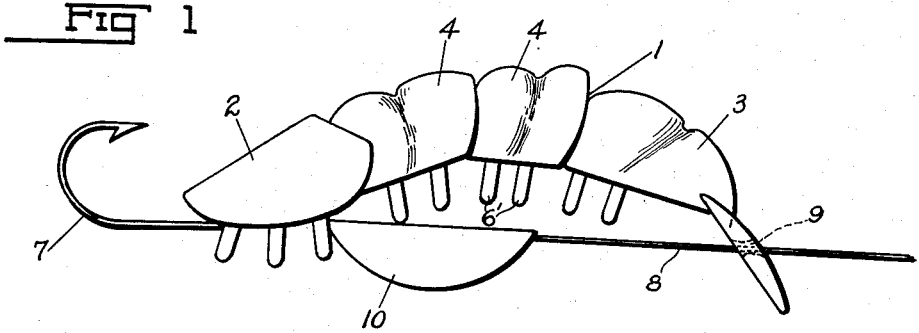
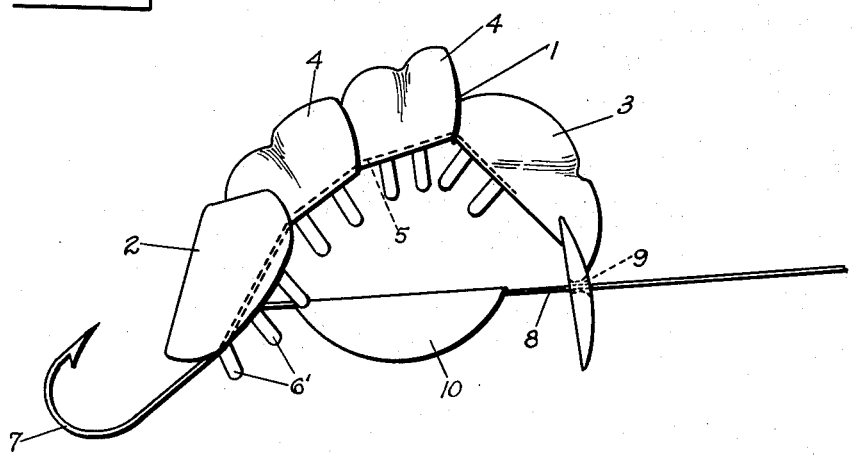
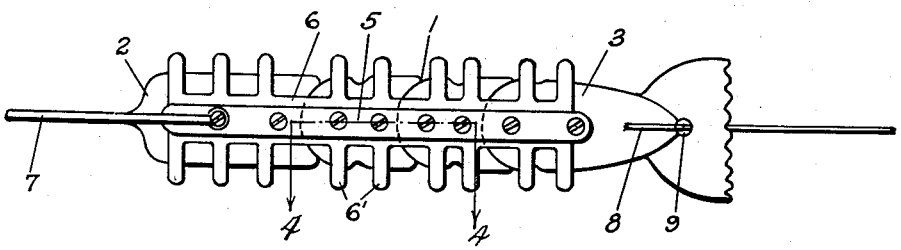
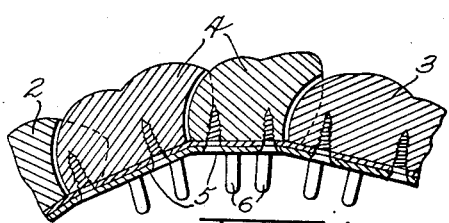
INVENTOR.
WILLIAM F. MARTIN
BY
Charles R. Werner

Patented Dec. 29, 1953

2,663,964

UNITED STATES PATENT OFFICE 2,663,964

ARTIFICIAL FISHING BAIT

William F. Martin, Amarillo, Tex., assignor of one-fourth to W. D. Burger, Amarillo, Tex., one-fourth to W. E. Warner, Hooker, Okla., and one-fourth to E. L. Morton, Stinnett, Tex.

Application October 13, 1947, Serial No. 779,550

1 Claim. (Cl. 43—42.02)

This invention relates in general to artificial fishing lures or baits, and in particular to an artificial shrimp capable of being animated by movement of the line to which it is attached.

In the art of fishing it is desirable to use a lure which closely resembles a living thing ordinarily sought after by fish as food. It is also desirable to animate the object to enhance its luring function. A live shrimp, when it is disturbed, rapidly darts backward.

It is therefore one object of my invention to provide a lure resembling a shrimp in appearance and movement.

It is another object to provide an artificial shrimp lure with a segmental body and means to provide movement between the segments of the body.

It is a still further object of my invention to provide an artificial shrimp lure with a segmental body and a line so attached to the lure to cause animation of the segments by movement on the line.

Other objects and advantages of my invention as well as its construction and operation will be apparent by reference to the following description in connection with the accompanying drawings in which:

Fig. 1 is a side elevational view of the artificial shrimp with hook, leadweight and leader or line attached.

Fig. 2 is a similar view showing the artificial shrimp in its arched position when a pull is imparted to the line.

Fig. 3 is a bottom view of the lure showing the resilient member which joins the sections of the shrimp, a fragmentary portion of the leader being shown and the weight omitted for clarity of illustration of other parts.

Fig. 4 is a fragmentary, longitudinal, cross sectional view on the line 4—4 of Fig. 3.

Referring now to the drawings by numerals of reference 1 designates the body of the artificial shrimp lure made up of a plurality of segments, the head or forward segment being designated 2, the tail or rear segment 3 and the intermediate segments 4.

A resilient member 5 is suitably secured to each of the segments and joins them rectilinearly, normally urging the segments into substantial alignment as shown in Fig. 1.

A flexible member 6 may be positioned between the resilient member 5 and the various segments, and is provided with legs 6' to present a more realistic lure.

A hook 7 is preferably secured to the underside of the front segment and a leader 8 may also be secured to the front segment and passes through opening 9 in the tail segment 3. To this leader is adjustably attached a lead weight or sinker 10. Proper positioning of the weight will cause the shrimp to settle slowly in the water in a natural manner.

In operation, the leader 8 is secured to the line on the rod or pole (not shown) in the regular manner. Reeling in by the fisherman of the line will create a pull on the leader 8 and subsequent pull on head segment 2. The inertia and resistance of the tail section 3 as well as the intermediate segments 4, will effect an arching of the shrimp. When the pull on the leader 8 is relieved the inherent resiliency of member 5 will cause the segments of the shrimp to assume their normal alignment.

This action can be made to be more or less continuous and the artificial shrimp made to appear to be animated and lifelike, particularly in its backward movement when the alternate arching and straightening out very accurately simulates a startled or disturbed shrimp.

It is apparent that other means may be used to interconnect the segments, to keep them in linear alignment, to provide a resilient relation between the segments and to misalign them or cause "arching" of the lure, but it is deemed that the basic physical relations and reactions between the elements must remain the same and that modifications in form, proportion and details of construction may be resorted to without departing from the spirit of the invention as covered by these specifications and the claim which follows.

What I claim as new and desire to secure by Letters Patent is:

In an artificial bait resembling a live shrimp, a body comprising a plurality of segments, a flat resilient member secured to the bottom of each of the segments, a hook carried by one segment, a leader secured to one segment and passing through one of the other segments, and an elongated strip comprising artificial feelers mounted between the flat resilient member and the segments.

WILLIAM F. MARTIN.

References Cited in the file of this patent

UNITED STATES PATENTS

| Number | Name | Date |
|---|---|---|
| 248,542 | Wilson | Oct. 18, 1881 |
| 879,869 | Hansen | Feb. 25, 1908 |
| 1,247,955 | Grube | Nov. 27, 1917 |
| 1,582,171 | Foss | Apr. 27, 1926 |
| 1,792,366 | Ettles | Feb. 10, 1931 |
| 1,795,205 | Fenderson | Mar. 3, 1931 |
| 1,928,418 | Garland | Sept. 26, 1933 |
| 2,036,954 | Murray | Apr. 7, 1936 |
| 2,089,605 | Hardy | Aug. 10, 1937 |
| 2,290,433 | Jeffers | July 21, 1942 |